(12) United States Patent
Fukuoka

(10) Patent No.: US 9,723,483 B2
(45) Date of Patent: Aug. 1, 2017

(54) MOBILE ELECTRONIC DEVICE

(71) Applicant: Kabushiki Kaisha Toshiba, Tokyo (JP)

(72) Inventor: Hiroki Fukuoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 32 days.

(21) Appl. No.: 14/834,014

(22) Filed: Aug. 24, 2015

(65) Prior Publication Data
US 2016/0073258 A1 Mar. 10, 2016

(30) Foreign Application Priority Data

Sep. 10, 2014 (JP) ................................. 2014-184201

(51) Int. Cl.
*H04M 3/16* (2006.01)
*H04W 12/06* (2009.01)
(Continued)

(52) U.S. Cl.
CPC .......... *H04W 12/06* (2013.01); *G06Q 20/322* (2013.01); *G06Q 20/3229* (2013.01);
(Continued)

(58) Field of Classification Search
CPC ..... H04W 12/06; H04W 12/08; H04W 88/02; H04B 1/3816; H04L 63/105; G06Q 20/322
(Continued)

(56) References Cited

U.S. PATENT DOCUMENTS 6,757,824 B1 * 6/2004 England ................ G06F 9/4416
713/156
7,174,457 B1 * 2/2007 England ................ G06F 9/4406
713/168

(Continued)

FOREIGN PATENT DOCUMENTS

| JP | 2004-265026 A | 9/2004 |
| KR | 1020090111128 A | 10/2009 |
| WO | 2013045898 A2 | 4/2013 |

OTHER PUBLICATIONS

"Mobile Security Platform," Solacia, Inc., May 28, 2011 (14 pages).
(Continued)

*Primary Examiner* — William Nealon
(74) *Attorney, Agent, or Firm* — Baker Botts L.L.P.

(57) ABSTRACT

A mobile electronic device according to an embodiment has an identifier, a determiner, and a permitter. The identifier identifies the operating system of a mobile terminal to which its own device is connected and determines whether the identified operating system is a prescribed operating system. If the identifier determines that the identified operating system is the prescribed operating system, the determiner performs processing to determine whether or not authentication data held in its own device and authentication data held in an authentication data holding device that can communicate via a network match. If the determiner determines that there is a match, the permitter permits data processing using processing data held in a processing data holding device that can communicate via the network.

11 Claims, 6 Drawing Sheets

(51) Int. Cl.
*H04B 1/3816* (2015.01)
*G06Q 20/32* (2012.01)
*H04L 29/06* (2006.01)
*H04W 12/08* (2009.01)
*H04W 88/02* (2009.01)

(52) U.S. Cl.
CPC ......... *H04B 1/3816* (2013.01); *H04L 63/105* (2013.01); *H04W 12/08* (2013.01); *H04W 88/02* (2013.01)

(58) Field of Classification Search
USPC ........................................................ 455/411
See application file for complete search history.

(56) References Cited

U.S. PATENT DOCUMENTS

| 8,417,643 | B2 | 4/2013 | Mardikar |
| 2007/0271466 | A1 | 11/2007 | Mak et al. |
| 2011/0312383 | A1* | 12/2011 | Youn ....................... G06F 9/441 455/558 |
| 2012/0005077 | A1 | 1/2012 | Pitroda et al. |
| 2012/0149330 | A1* | 6/2012 | Watson ................. H04W 12/06 455/411 |
| 2013/0097698 | A1 | 4/2013 | Taveau et al. |
| 2013/0219507 | A1* | 8/2013 | Chang ..................... G06F 21/60 726/26 |
| 2013/0347064 | A1 | 12/2013 | Aissi |
| 2014/0058937 | A1 | 2/2014 | Watson |
| 2014/0108256 | A1 | 4/2014 | Bircher-Nagy et al. |
| 2014/0143155 | A1 | 5/2014 | Karlov et al. |
| 2014/0150104 | A1 | 5/2014 | Bousquet et al. |

OTHER PUBLICATIONS

Extended European Search Report in related EP application No. 15180967.0, mailed Jan. 8, 2016 (9 pages).

Office Action in related Singapore application No. 10201506577W, mailed Jan. 12, 2016 (10 pages).

* cited by examiner

MOBILE ELECTRONIC DEVICE

CROSS-REFERENCE TO RELATED APPLICATION

This application is based upon and claims the benefit of priority from Japanese Patent Application No. 2014-184201, filed Sep. 10, 2014; the entire contents of which are incorporated herein by reference.

FIELD

Embodiments of the present invention relate to a mobile electronic device.

BACKGROUND

In mobile terminals such as mobile telephones, including smartphones, a UIM (User Identity Module) card connected thereto is used, into which is stored personal information such as a telephone number.

As one example, there will be described the flow of processing up until the point at which an application of a mobile terminal uses a communication circuit. First, in the mobile terminal, after the mobile terminal is started, a power supplied from the mobile terminal activates the UIM connected to the mobile terminal. After that, the carrier that manages the UIM uses shared secret information stored in a secure area of the UIM to perform an internal authentication, which verifies the authenticity of the UIM. The UIM that has passed the internal authentication normally, the mobile terminal to which the UIM is connected and the application installed in the mobile terminal use the communication circuit of the carrier that manages the UIM.

In the operating system (OS) for some mobile terminals, HCE (host card emulation), without using a secure element (SE) such as a UIM, performs NFC (near-field communication) payment, has been proposed. In the HCE arrangement, processing such as payment, which demands a high level of security, is performed using a secure OS that is distinctive from the non-secure OS. The non-secure OS is, for example, the Android (registered trademark) OS. The secure OS, rather than acquiring sensitive data such as personal information or credit card information from a secure element, performs payment transactions and the like by acquisition thereof from a cloud server. The secure OS may refer to: 1) a security-increased OS which is modified to increase the security; 2) a security-focused OS which is devoted to increasing the security; or 3) an OS which is modified from a mobile operating system or an open-source mobile operating system to increase the security. The non-secure OS may refer to the mobile operating system or the open-source mobile operating system.

In the HCE arrangement, information regarding a contractor of the communication circuit is stored in the UIM, and sensitive data is stored in the cloud, so that these two types of information are separated and used independently. The information regarding the contractor of the communication circuit is, for example, information regarding the contractor of the mobile terminal.

These two types of information are usually with regard to the same person. However, when the UIM in the mobile terminal is arbitrarily replaced, or when a parent, who is the contractor, makes a child use the mobile terminal, the two types of data may differ, and with related art this type of situation has been permitted. In this situation, for example, if improper processing is done with a stolen UIM, it has been difficult to track the criminal. Considering this, depending upon the type of information being transmitted and received, it is desirable that the separated information is for the same person, particularly when information for payment of large amounts or medical information is handled. In this case, being of the same person is the establishment of identity matching of the user. In order to establish the user identity matching in HCE, it must be possible for the UIM application to identify whether the use of the communication circuit is by the non-secure OS or by the secure OS.

In the UIM application, however, the identification of the difference between mobile terminal operating systems may be impossible. For this reason, in the UIM application, for example, even for a command from the secure OS it may have been impossible to verify the identity matching between the contractor of the mobile terminal and the contractor of the UIM to determine whether or not to permit use of the communication circuit.

DETAILED DESCRIPTION

The mobile electronic device of the embodiment will be described below, with references made to the drawings.

Figure 1:
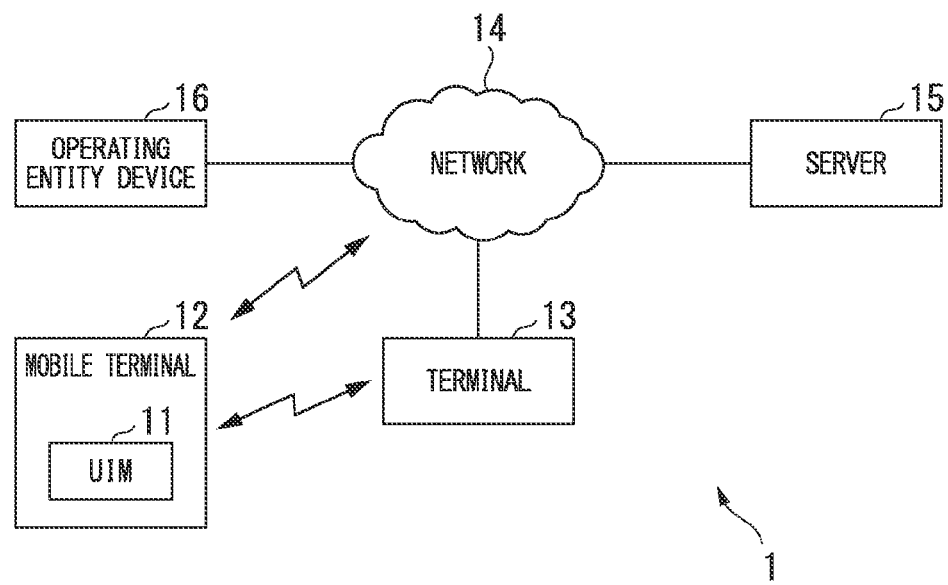
FIG. 1 is a drawing showing a communication system of an embodiment.

FIG. 1 shows a communication system 1 of the embodiment.

The communication system 1 may include, but is not limited to, a UIM 11, a mobile terminal 12, a terminal 13, which is a reader/writer (R/W), a network 14, a server 15, and an operating entity device 16.

The mobile terminal 12 may be, for example, a mobile telephone terminal such as a smartphone. The UIM 11 is inserted into an insertion slot of the mobile terminal 12. The UIM 11 can electrically communicate with the mobile terminal 12. The UIM 11 can be attached to and removed from the mobile terminal 12. The term "attachable-and-removable" means that it can be inserted and removed.

The terminal 13, the server 15, and the operating entity device 16 are connected to the network 14 via a wired or wireless circuit.

The mobile terminal 12 gets connected to the network 14 by communicating wirelessly with a base station or the like (not shown) connected to the network 14.

The mobile terminal 12 and the terminal 13 perform communication by NFC.

In the present embodiment, the operating entity providing the operating entity device 16 installs the terminal 13. The operating entity device 16 and the terminal 13 communicate via the network 14. Operating entities may be various companies, for example, an entity that processes payment for a product of a store in which the terminal 13 is installed, by communication with the terminal 13 and the mobile terminal 12 of the purchaser.

The server 15 is a cloud server that stores in memory information having a high security, such as personal information of the users of the mobile terminal 12. Information having high security will be also referred to herein as sensitive data.

In this case, in the present embodiment, the sensitive data include authentication data for authenticating the UIM 11 and processing data used in processing after authentication has been performed normally. The processing after authentication is performed normally may be various processing, for example, processing of payments. Although the authentication data and the processing data are, for example, different data, they may be the same data.

Figure 2:
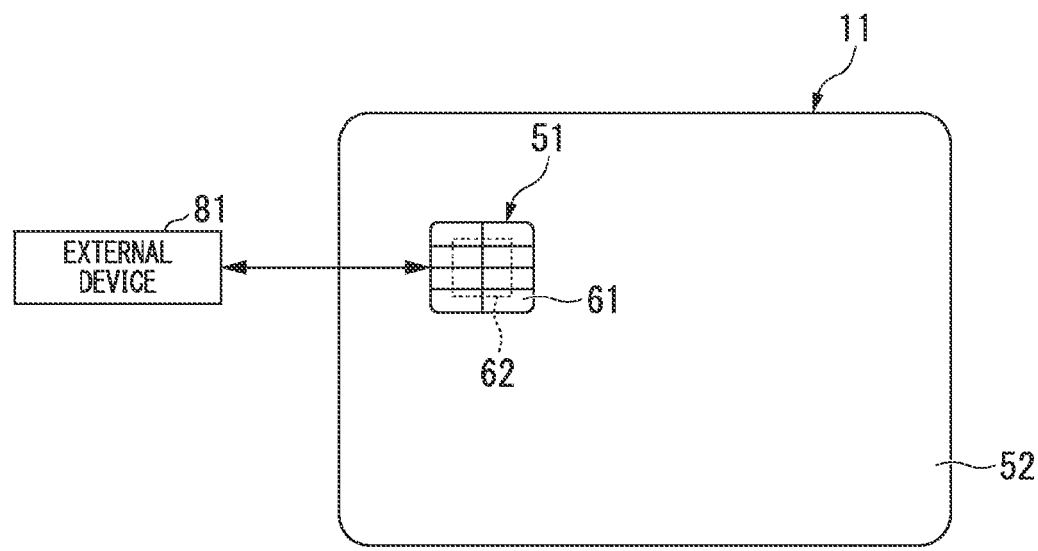
FIG. 2 is a drawing showing an example of the outer appearance of a UIM of the embodiment.

FIG. 2 shows an example of the outer appearance of the UIM 11 of the embodiment and also shows the outer appearance of a card-type (IC card-type) UIM 11.

As shown in FIG. 2, the UIM 11 has an IC module 51. The IC module 51 has a contact part 61 and an internal IC chip 62. The UIM 11 is formed, for example, by mounting the IC module 51 onto a plastic card substrate 52. The card substrate 52 is an example of the main part of the card. In this manner, the UIM 11 has the IC module 51 and the card substrate 52 into which the IC module 51 is embedded. The UIM 11 can communicate with an external device 81 via the contact part 61. In the present embodiment, the external device 81 is, for example, the mobile terminal 12 and the terminal 13.

The UIM 11, for example, receives a command (processing request) transmitted by the external device 81 via the contact part 61, and executes processing responsive to the received command (command processing). The UIM 11 then transmits to the external device 81 a response (processing response), which is the result of executing the command processing, via the contact part 61.

In this case, the external device 81 is an upstream device communicating with the UIM 11 and, alternatively, a reader/writer or other devices may be used.

The IC module 51 has the contact part 61 and the IC chip 62 and is, for example, a module that traded in the form of COT (chip-on-tape), in which a plurality of IC modules 51 are disposed on a tape.

The contact part 61 has terminals for various signals required for operation of the UIM 11. In this case, the terminals of the various signals are terminals for receiving a power supply voltage, a clock signal, and a reset signal and the like that are supplied from the external device 81, and a serial data input/output (SIO terminal) terminal for communicating with the external device 81. The terminals for accepting supply from the external device 81 include power supply terminals (VDD terminal and GND terminal), a clock signal terminal (CLK terminal), and a reset signal terminal (RST terminal).

The IC chip 62 is, for example, an LSI (large-scale integration) device such as a single-chip microprocessor.

FIG. 2 shows the outer appearance of the UIM 11 that communicates with the external device 81 by a contact method, using the contact part 61. As an example of another configuration, in a UIM 11 having a contact-type communication function and contactless communication function, an antenna is additionally provided in the configuration of FIG. 2 for the purpose of performing contactless communication. That UIM 11 is provided with yet other circuits if necessary. As an example of another configuration, in a UIM 11 having a contactless communication function and not having a contact-type communication function, an antenna is provided for the purpose of performing contactless communication. That UIM 11 is provided with yet other circuits if necessary.

Figure 3:
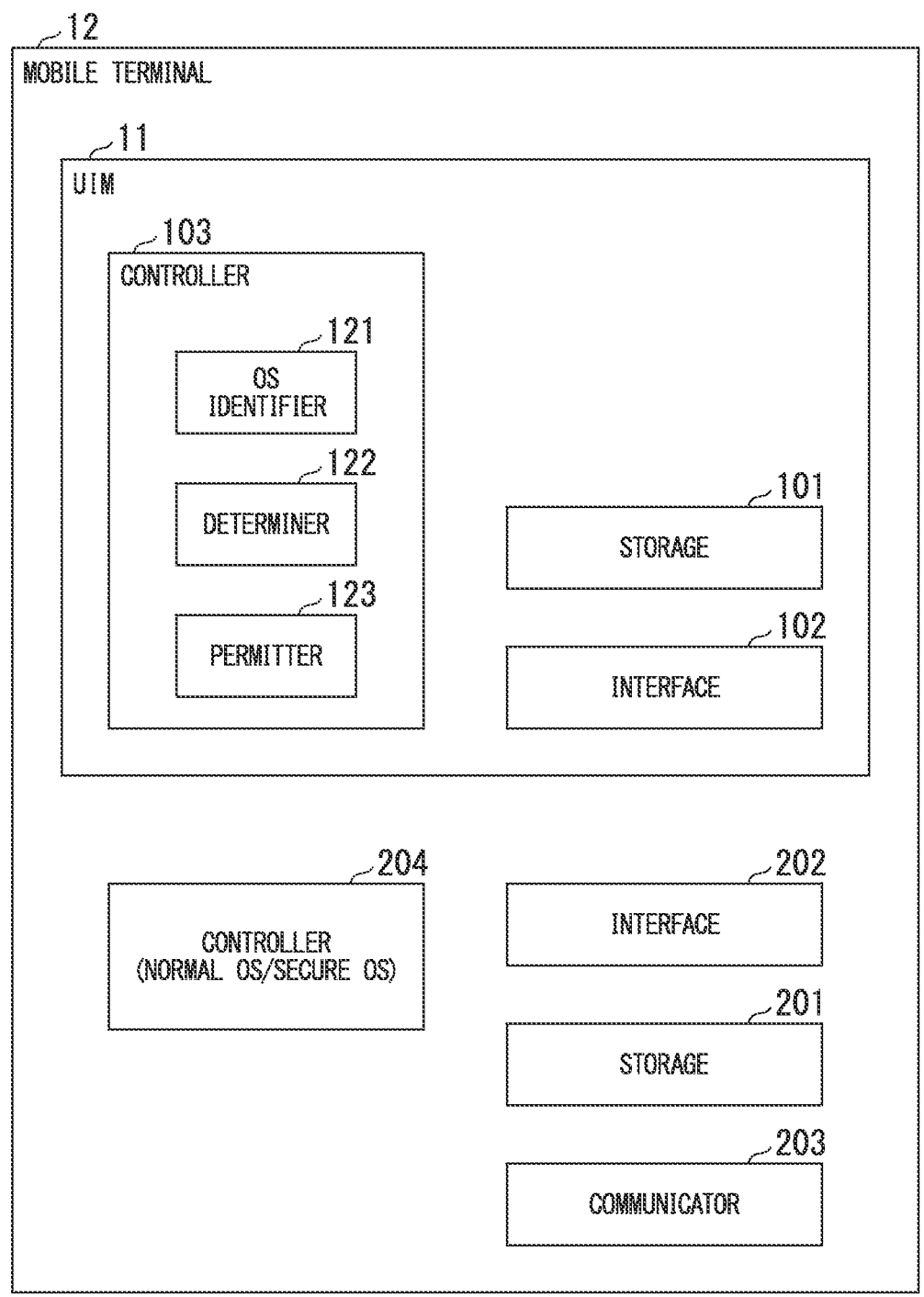
FIG. 3 is a drawing showing an example of the configuration of a mobile terminal and the UIM of the embodiment.

FIG. 3 is shows an example of the mobile terminal 12 and the UIM 11 in the embodiment. FIG. 3 shows the condition in which the UIM 11 is inserted into and connected with the mobile terminal 12.

The UIM 11 has a storage 101, an interface 102, and a controller 103. The controller 103 has an OS identifier 121, a determiner 122, and a permitter 123.

The mobile terminal 12 has a storage 201, an interface 202, a communicator 203, and a controller 204.

The UIM 11 will now be described.

The storage 101 stores in its area a program and various data. The storage 101 has, for example, a volatile EEPROM (electrically erasable programmable ROM), the stored contents of which are overwritable, RAM (random-access memory) that temporarily holds data at the time of processing by the controller 103, and ROM (read-only memory) that stores a program executed by the controller 103. In the present embodiment, the storage 101 stores in its area authentication data, external authentication data, and internal authentication data. The authentication data, external authentication data, and internal authentication data are, for example different data, although they may be the same data.

The interface 102 communicates with the interface 202 of the mobile terminal 12, by contact-type or contactless communication.

The controller 103 performs various types of processing and control in the UIM 11. The controller 103 has a CPU (central processing unit) and executes a program stored in the area of the storage 101 to perform various types of processing and control.

The OS identifier 121 identifies the OS launched in the mobile terminal 12. In the present embodiment, the OS identifier 121 identifies as the launched OS the OS from which access is made from the mobile terminal 12.

In this case, the OS identifier 121 may use various methods to identify the OS. One example may be that of performing external authentication by the OS identifier 121 using shared secret information in the UIM 11, so as to identify the OS. In this method, authentication is performed using secret information that is shared beforehand between the OS installed in the mobile terminal 12 and the UIM 11. Another example may be one in which, in the UIM 11, the OS identifier 121 verifies the certification that has been granted to the OS from a certifying station so as to identify the OS. In this method, a certification granted from the certifying station to the OS installed in the mobile terminal 12 is verified.

The determiner 122 compares the authentication data stored in the storage 101 with the authentication data held in the server 15 that can communicate via the network 14 and determines whether or not these authentication data match.

In this case, as the form of determining whether the two authentication data match, determining that the two authentication data coincide may be used or, alternatively, determining that the two authentication data do not coincide but both represent corresponding contents may be used.

Although various data may be used as the authentication data, in the present embodiment, data regarding the contractor of the mobile terminal 12 is used. Also, information regarding the same contractor who owns the mobile terminal 12 is held separately in the UIM 11 and in the server 15. In this case, the same contractor is taken to be the same person. Also, information regarding the same contractor is sensitive data, including authentication data, and the server 15 may implements cloud computing.

As one example, one or both of the authentication data stored in the UIM 11 and stored in the server 15 may be the hash value of prescribed data. The hash value, for example, may be stored when the contract for the mobile terminal 12 is executed. In another example, one or both of authentication data stored in the UIM 11 and stored in the server 15 may be the prescribed data, which is data used to calculate a hash value.

As a specific example, because the secure OS of the mobile terminal 12 transmits some information for the purpose of accessing sensitive data of the server 15, data regarding that information is stored beforehand into the storage 101 of the UIM 11. An example of the data is a hash value. A configuration may be used wherein, before a prescribed transaction, when the UIM 11 transmits data to the server 15, or when it receives data from the server 15, authentication is performed using that data. In the present embodiment, cloud computing is implemented by the server 15.

In the present embodiment, the UIM 11 receives authentication data from the server 15 via the mobile terminal 12, and the determiner 122 determines whether the received authentication data matches the authentication data stored in its device. In place of the authentication data, data resulting from processing the authentication data may be used. When this is done, for example, in the UIM 11 if one or both of the received authentication data and the authentication data stored therein is the prescribed data, the determiner 122 can calculate the hash values using the prescribed data and compare the authentication data in the form of hash values of the data. The prescribed data is used to calculate the hash value. As another example of the configuration, the UIM 11 can transmit to the server 15 authentication data stored therein via the mobile terminal 12, and the server 15 can determine whether or not the received authentication data and the authentication data stored therein match, information of the result being transmitted to the UIM 11 via the mobile terminal 12. Data resulting from processing the authentication data may be used in place of the authentication data. Transmitting information of the result makes it possible to notify of the result.

If the determiner 122 determines that the two authentication data match, then the permitter 123 performs control so that prescribed processing is permitted. The prescribed processing may various processing and, in the present embodiment, uses information stored by the server 15 that can communicate via the network 14, the information being sensitive data.

As another example of the configuration, when the UIM 11 receives the information of the result of determining in the server 15 whether or not there is a match between the authentication data, if based on the received information the determination is that there was a match of the authentication data, the permitter 123 performs the control to permit the prescribed processing.

In this manner, in the present embodiment, in the UIM 11 that interprets and executes a command instructed from the OS installed in the mobile terminal 12, the OS identifier 121 identifies the OS making the access and, as a result of the identification, if it is determined that the OS requires verification that the contractor of the mobile terminal 12 and the contractor of the UIM 11 are the same, the determiner 122 performs processing to determine the match between the identities of the contractor of the mobile terminal 12 and the contractor of the UIM 11. As a result of this, only when this comparison is successful the permitter performs control so as to permit subsequent prescribed processing by the OS of the mobile terminal 12. The present embodiment will be described herein in the case in which, although the contractor of the mobile terminal 12 and the UIM 11 often has physical possession of both, the contractor, for example, loses either the mobile terminal 12 or the UIM 11, and then a third person acquires and has physical possession either thereof, in which case the contractor of the mobile terminal 12 and the contractor of the UIM 12 are different from each other. The determination of matching verifies an identity-match. An application may be used in place of the OS, and the combination of the OS and the application may be used. The prescribed processing is, for example, processing to attempt to establish a communication circuit.

The mobile terminal 12 will now be described.

The storage 201 stores in its area programs and various data. The storage 201 may include, for example, a non-volatile EEPROM that permits the stored contents to be over-writable, a RAM that temporarily holds data at the time of processing by the controller 204, and a ROM that stores a program executed by the controller 204. In the present embodiment, the storage 201 stores in its area internal authentication data that authenticates the UIM 11, representing internal authentication in this case.

The interface 202 communicates with the interface 102 of the UIM 11, via contact type or contactless communication.

The communicator 203 communicates with an external device. In the present embodiment, the communicator 203 has a function that communicates with the terminal 13 by NFC, and a function that wirelessly communicates with a base station or the like connected to the network 14. The terminal 13 is just one example of an external device. The base station or the like is another example of an external device.

The controller 204 performs various processing and control in the mobile terminal 12. The controller 204 may include a CPU to execute a program stored in the area of the storage 201, and to perform various processing and control.

In the present embodiment, the controller 204 has two operating systems, which may be, for example, Android (registered trademark) as the normal operating system and a secure operating system having a security level that is higher than the normal operating system. The controller 204 executes an application installed in the mobile terminal 12.

In the present embodiment, in the mobile terminal 12, the two operating systems are switched in accordance by operations made by the user. In the mobile terminal 12, one OS switched (only this OS in the present embodiment) is launched. As one example, at a normal time the user performs switching so that the non-secure OS is launched at a normal time and so that the secure OS is launched when a high level of security is required, such as with HCE. As another example of the configuration, the mobile terminal 12 may have three or more operating systems.

Figure 4:
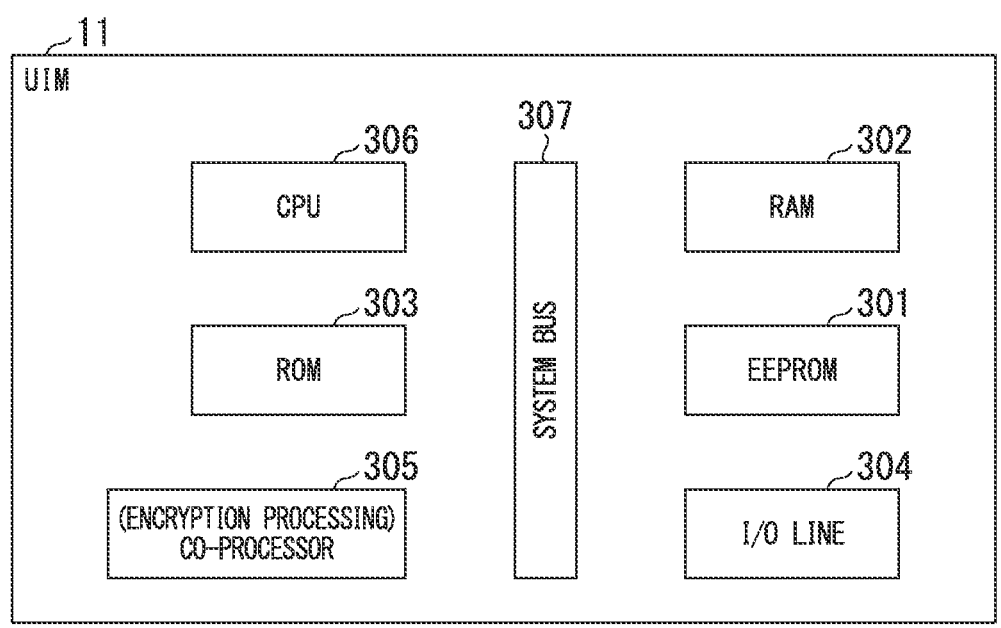
FIG. 4 is a drawing showing an example of the hardware configuration of the UIM of the embodiment.

FIG. 4 shows an example of the hardware configuration of the UIM 11 of the embodiment.

The UIM 11 may include an EEPROM 301, a RAM 302, and a ROM 303, which constitute a storage device, an input/output line (I/O line) 304, which is a line for communicating information with an external device, a coprocessor 305, a CPU 306, which is an arithmetic unit, and a system bus 307 that mutually connects these elements. In this case, the external device is separate from the UIM 11, for example, the mobile terminal 12. The communication of information is communication between the UIM 11 and the external device. The communication includes input and output.

In the example of FIG. 4, the UIM 11 includes the coprocessor 305, which executes specific processing that assists the CPU 306. The specific processing in the present embodiment encrypts data and decrypts encrypted data. As another example of the configuration, the UIM 11 may be free of the coprocessor 205 and may execute all processing by the CPU 306.

In the example shown in FIGS. 3 and 4, the functions of the EEPROM 301, the RAM 302, and the ROM 303 implement the storage 101, the function of the I/O line 304 implements the interface 102, and the functions of the CPU 306 and coprocessor 305 implement the controller 103.

Figure 5:
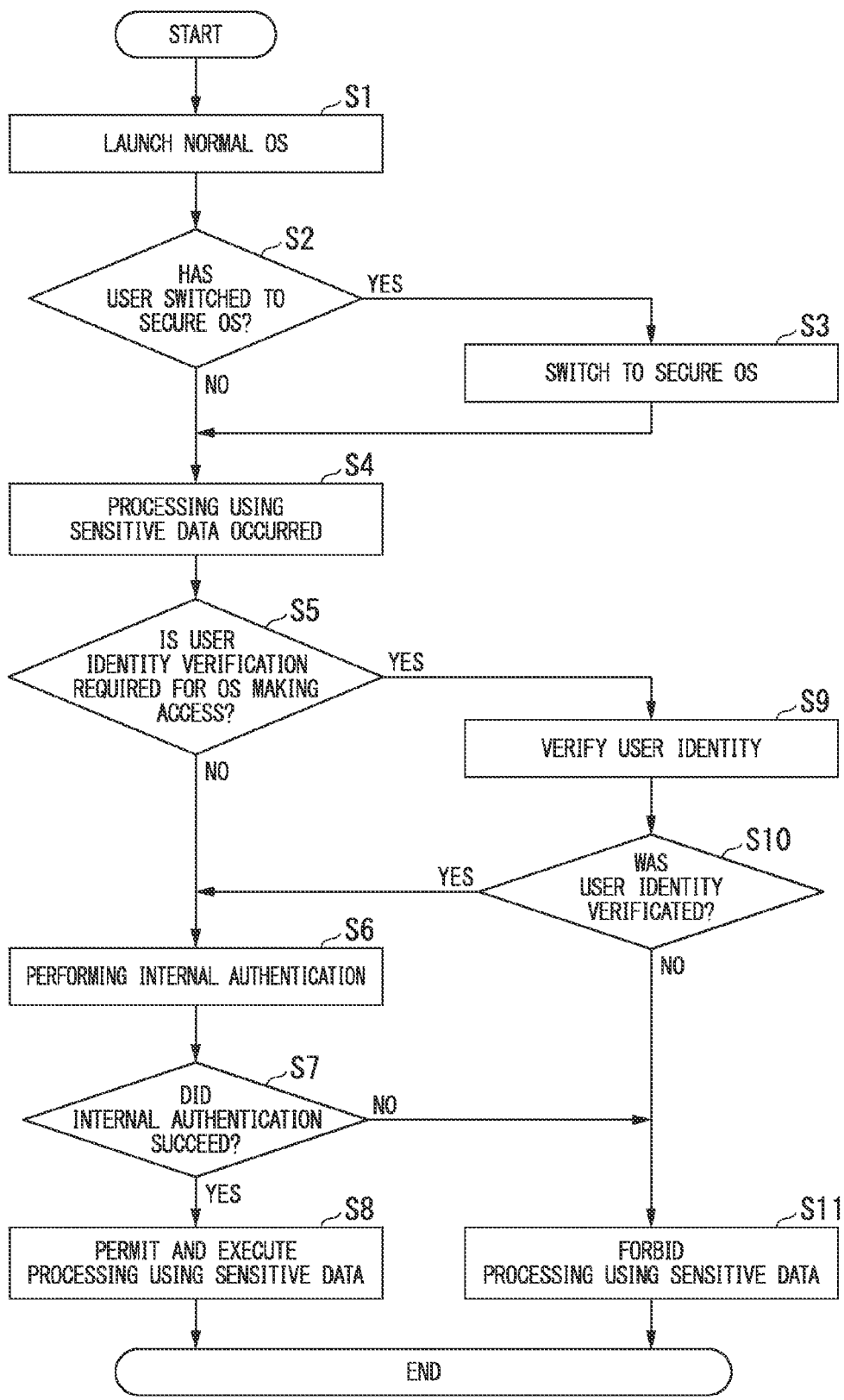
FIG. 5 is a flowchart showing an example of the processing procedure performed in the UIM and the mobile terminal of the embodiment.

FIG. 5 is a flowchart showing an example of the processing procedure performed in the UIM 11 and the mobile terminal 12 of the embodiment.

(Step S1)

The UIM 11 is inserted into and connected with the mobile terminal 12. The user first switches on the power supply of the mobile terminal 12. When this is done, in the mobile terminal 12 the controller 204 launches a predetermined OS. This OS is the non-secure OS in the present embodiment. The power switched on in the mobile terminal 12 is then supplied to the UIM 11, thereby activating the UIM 11.

(Step S2)

In the mobile terminal 12, the controller 204 monitors operations made by the user and detects whether or not an instruction to switch from the non-secure OS to the secure OS has been accepted. This operation is a key operation of the mobile terminal 12.

As a result, in the mobile terminal 12, if the controller 204 detects that an instruction to switch from the non-secure OS to the secure OS has been accepted, processing proceeds Step S3. If, however, it does not detect that an instruction to switch from the non-secure OS to the secure OS has been accepted, processing proceeds to Step S4.

(Step S3)

In the mobile terminal 12, the controller 204 switches the OS to be launched from the non-secure OS to the secure OS, thereby launching the secure OS, at which point processing proceeds to Step S4.

(Step S4)

Consider the case in which, in the UIM 11 and the mobile terminal 12, processing that uses sensitive data of the server 15 has occurred. As one example, in order to make a payment, the user holds the mobile terminal 12 up to the terminal 13, and payment processing that uses sensitive data of the server 15 starts. In the mobile terminal 12, the controller 204 detects the request for such processing, and in the UIM 11, the controller 103 detects the request for such processing.

(Step S5)

In the UIM 11, the OS identifier 121 identifies that the OS accessing the UIM 11 from the mobile terminal 12 is the launched OS. In the UIM 11, the OS identifier 121 then determines whether or not the identified OS is an OS that requires verification of the identity of the user.

As a result, if the OS identifier 121 in the UIM 11 determines that the identified OS is an OS requiring verification of the user identity, processing proceeds to Step S9. If, however, the OS identifier 121 in the UIM 11 determines that the identified OS is not an OS requiring verification of the identity of the user, processing proceeds to Step S6.

Specifically, in the present embodiment, the non-secure OS is an OS that does not require verification of the user identity, and the secure OS is an OS that requires verification of the user identity.

(Step S6)

The carrier that manages the UIM performs internal authentication with respect to the UIM 11. Specifically, the carrier that manages the UIM compares the internal authentication data stored in the storage 101 of the UIM 11 with the internal authentication data it itself holds and determines whether these internal authentication data match.

In this case, one form of determining whether or not two internal authentication data match, may determine that there is a match if the two internal authentication data coincide, and another may determine that there is a match if the two internal authentication data do not coincide, but both data represent the same corresponding contents. Various data may be used as the internal authentication data.

(Step S7)

In the UIM 11, if the result of the processing at Step S6 is the determination that the internal authentication data stored in the storage 101 of the UIM 11 and the internal authentication data held by the carrier match, processing proceeds to Step S8. If, however, in the UIM 11, the determination is that the internal authentication data stored in the storage 101 of the UIM 11 and the internal authentication data held by the carrier do not match, processing proceeds to Step S11.

In the above, the carrier notifies the UIM 11 of the result of determining whether or not the internal authentication data matches, and the UIM 11 performs this determination, based on the content of the notification.

(Step S8)

The permitter 123 in the UIM 11 permits processing using prescribed sensitive data. This causes the permitted processing to be executed in the UIM 11 and the mobile terminal 12. In the present embodiment, the prescribed processing using sensitive data is payment processing of establishing a communication circuit of the carrier of the operating entity, communicating with the server 15 that can communicate via the network 14, and using the sensitive data held in the server 15. The operating entity in the present embodiment is an operating entity providing the operating entity device 16.

(Step S9)

If the result of Step S5 is the determination that the OS identified by the OS identifier 121 in the UIM 11 is an OS requiring verification of the identity of the user, processing to verify that the identity of the user is executed. Specifically, the determiner 122 in the UIM 11 communicates with the server 15 that can communicate via the network 14 and determines whether the authentication data stored in its own storage 101 and the authentication data held in the server 15 match.

(Step S10)

If the result at Step S9 is that the determiner 122 in the UIM 11 determined that the authentication data stored in its own storage 101 and the authentication data held in the server 15 match, the determination is made that the user of the UIM 11 and the user of the mobile terminal 12 have the same identity, and processing proceeds to Step S6. If, however, the determiner 122 in the UIM 11 determined that the authentication data stored in its own storage 101 and the authentication data held in the server 15 do not match, then the determination is made that there is no match of user identity between the UIM 11 and the mobile terminal 12, and processing proceeds to Step S11.

(Step S11)

In the UIM 11, if the result of the processing at Step S7 is that the internal authentication did not succeed or the result of the processing at Step S10 is that the authentication did not succeed, the permitter 123 prohibits the prescribed processing using sensitive data. The case in which, as a result of the processing at Step S10 the authentication did not succeed, is the case in which it was impossible to verify the identity of the user. Therefore, the non-permitted processing is not executed in the UIM 11 and the mobile terminal 12. This then ends the processing flow.

In this manner, in the UIM 11 of the present embodiment, verification is performed of the user identity matching with regard to a transaction from a specific OS of the mobile terminal 12 and, after user identity matching is normally established, an internal authentication is performed and, if this succeeds, the communication circuit is established and payment processing is executed. The specific OS in the present embodiment is the secure OS.

Figure 6:
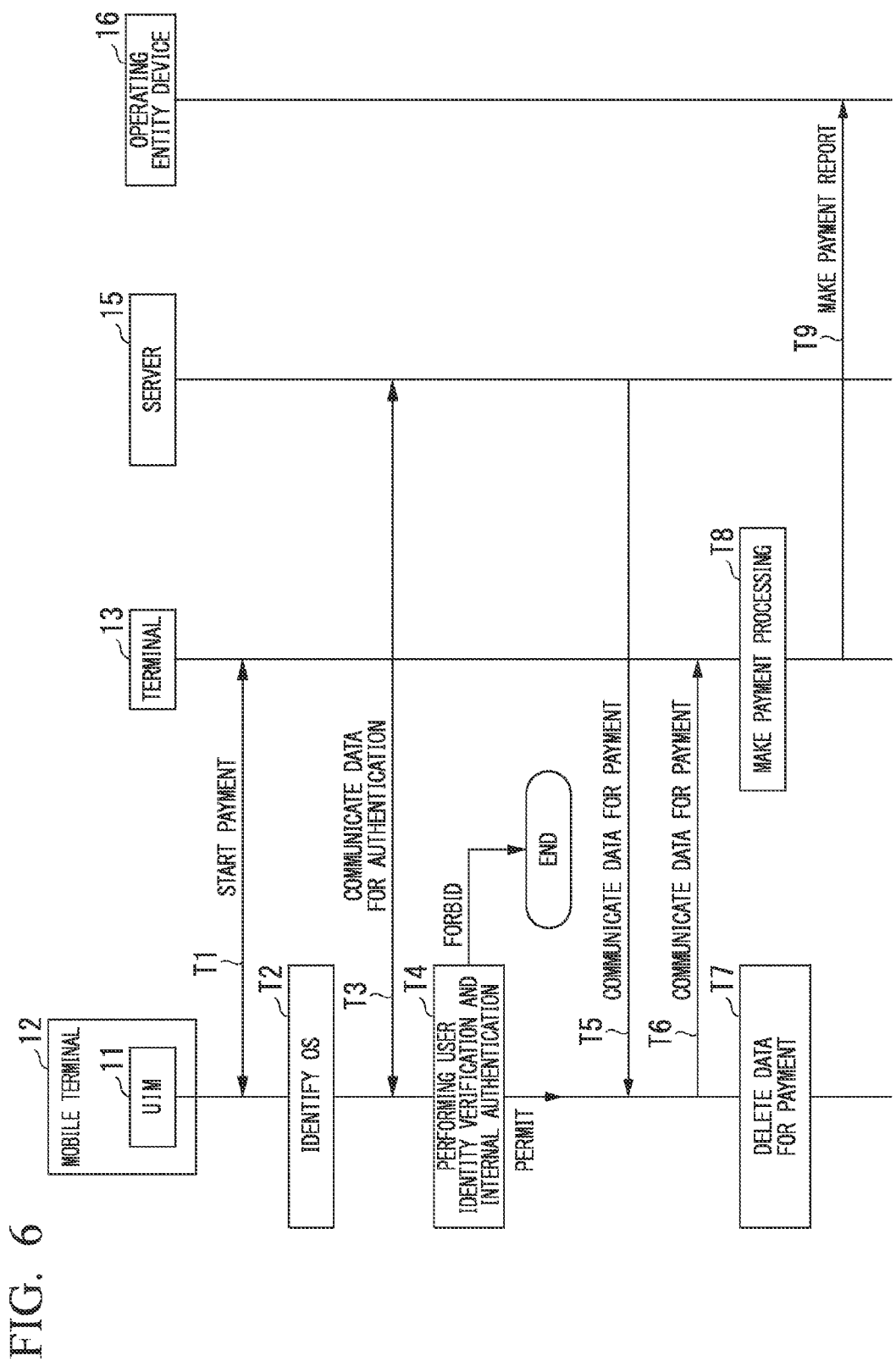
FIG. 6 is a sequence diagram showing an example of the processing performed in the communication system of the embodiment.

FIG. 6 is a sequence diagram showing an example of the processing performed by the communication system 1 in the present embodiment.

The example in FIG. 6 shows the mobile terminal 12, the UIM 11 inserted into and connected with the mobile terminal 12, the terminal 13, the server 15, and the operating entity device 16.

The example in FIG. 6 generally shows the processing starting from Step S4 shown in FIG. 5.

(Processing T1)

The mobile terminal 12 is held up to the terminal 13, and the mobile terminal 12 and the terminal 13 communicate, so as to start the payment processing. The UIM 11 detects the start of the payment processing.

(Processing T2)

The UIM 11 identifies the OS that is launched in the mobile terminal 12. In this example, this OS is the secure OS.

(Processing T3)

The UIM 11, via the mobile terminal 12, communicates authentication data with the server 15.

(Processing T4)

The UIM 11 performs authentication processing that, in this example, verifies user identity matching between the UIM 11 and the server 15. If this authentication is performed normally, internal authentication is performed between the UIM 11 and the carrier. In this case, if either the user identity matching verification or the internal authentication fails, the UIM 11 forbids subsequent processing regarding payment.

(Processing T5)

If both the verification of user identity matching and internal authentication succeed, the UIM 11 permits subsequent processing regarding payment. The UIM 11 then communicates data for processing with the server 15, via the mobile terminal 12. Processing data in this example is data for payment processing. In this example, the UIM 11 receives sensitive data to be used in payment processing from the server 15 and stores it temporarily in the storage 101. The sensitive data in this example is data for processing.

(Processing T6)

The UIM 11 communicates data for payment with the terminal 13, via the mobile terminal 12. In this example, the UIM 11 transmits sensitive data received from the server 15 to be used in payment processing to the terminal 13. The sensitive data in this example is data for processing.

(Processing T7)

In this example, the UIM 11 erases (deletes) the sensitive data transmitted to the terminal 13 from the storage 101. This prevents leaking of the sensitive data. The sensitive data in this example is data for processing.

(Processing T8)

The terminal 13 uses the data received from the UIM 11 to execute payment processing.

(Processing T9)

The terminal 13 transmits information of the results of the payment processing to the operating entity device 16 to report, or notify of, the results.

In this manner, in the example shown in FIG. 6, when the UIM 11 communicates with the terminal 13 via the mobile terminal 12 to perform payment, it receives, or downloads, sensitive data from the server 15 and notifies the terminal 13 of the data, and the terminal 13 executes the payment processing. In this example, cloud computing is implemented by the server 15. When the processing for payment is completed in the device of the UIM 11, the data is erased.

Notification of the completion of payment processing may be made from the terminal 13 to the UIM 11 and, after receiving the notification, the UIM 11 may erase the data.

Figure 7:
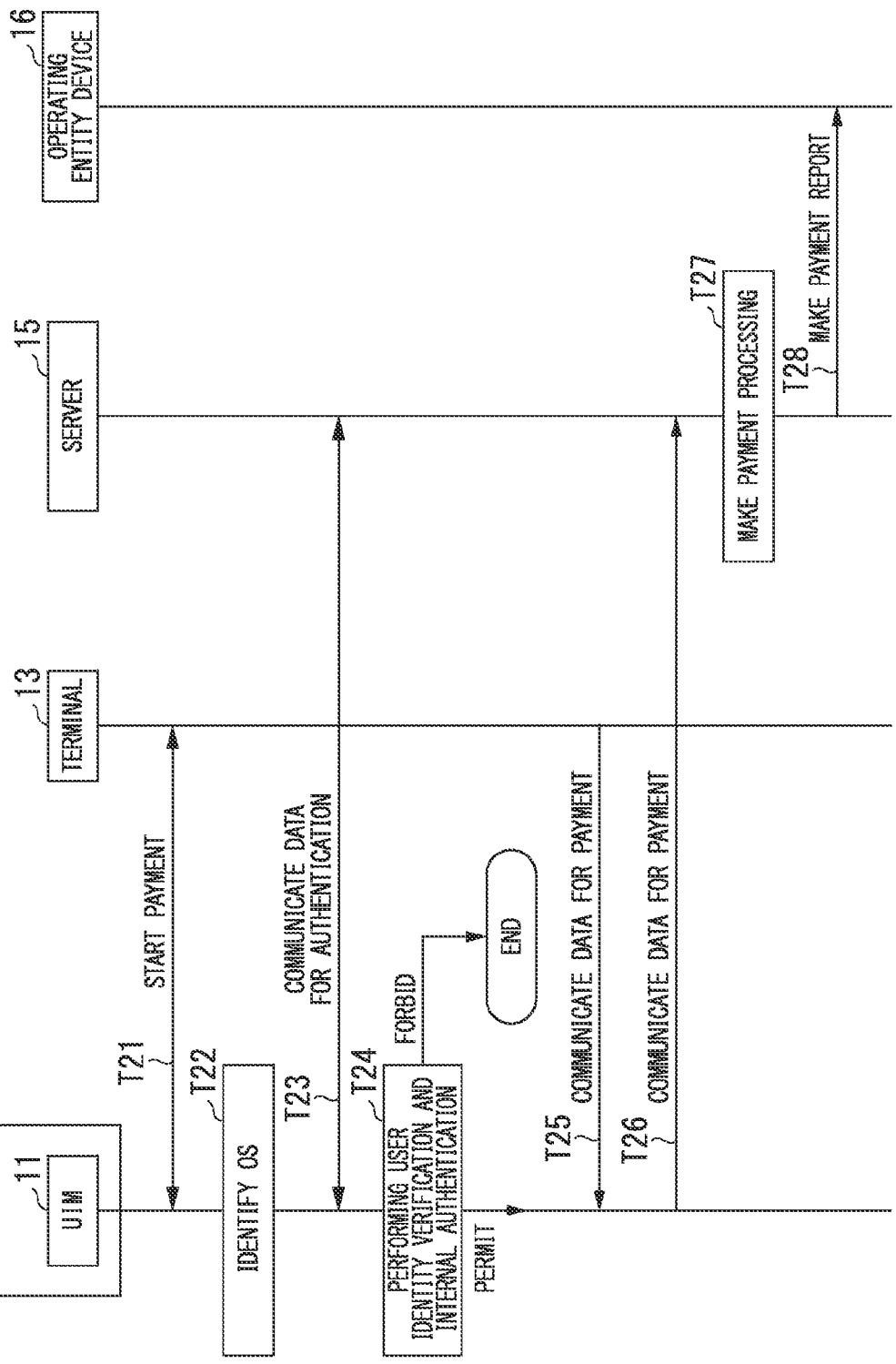
FIG. 7 is a sequence diagram showing another example of the processing performed in the communication system of the embodiment.

FIG. 7 is a sequence diagram of another example of processing performed in the communication system 1 in the embodiment.

The example of FIG. 7 shows the mobile terminal 12 the UIM 11 inserted into and connected therewith, the terminal 13, the server 15, and the operating entity device 16.

The example in FIG. 7 generally shows the processing starting from Step S4 shown in FIG. 5.

(Processing T21 to T24) Processing T21 to Processing T24 are each the same as Processing T1 to Processing T4, respectively, in the example of FIG. 6.

(Processing T25)

If both the verification of user identity matching and the internal authentication succeed, the UIM 11 permits subsequent processing for payment. The UIM 11 then communicates data for payment between the terminal 13, via the mobile terminal 12. In this example, the UIM 11 receives data for payment from the terminal 13. Various data may be used as the data for payment, for example, information that identifies one or both of the mobile terminal 12 and the UIM 11, information that identifies the terminal 13, information regarding a product to be paid for, or information about an amount that is to be paid.

(Processing T26)

The UIM 11 communicates data for payment with the server 15, via the mobile terminal 12. In this example, the UIM 11 transmits the data for payment received from the terminal 13 to the server 15.

(Processing T27)

The server 15 uses the data received from the UIM 11 to execute payment processing. In this example, the server 15 executes processing for payment, using sensitive data used in processing payment that has been stored in its own device. In this manner, by preventing processing data from outputting outside the server 15, the leaking of sensitive data is prevented. In this example, the sensitive data is processing data.

(Processing T28)

The server 15 transmits and reports, or notifies of, the information of the results of the payment processing to the operating entity device 16.

In this manner, in the example of FIG. 7, when the UIM 11 communicates with the terminal 13 via the mobile terminal 12, notification is made to the server 15 of the data received from the terminal 13, and the server 15 executes the payment processing. In this example, cloud computing is implemented by the server 15.

A configuration may be used in which notification of the completion of payment processing is made to the UIM 11 from the server 15.

In the above-noted embodiment, a mobile telephone terminal such as a smartphone has been used as an example of the mobile terminal 12. With regard to this, as another example of the configuration, various devices into which a computer is incorporated may be used as the mobile terminal 12.

In the above-noted embodiment, a UIM has been used as an example of a mobile electronic device. In this case, a card known as a USIM (Universal Subscriber Identity Module), or a SIM (Subscriber Identity Module) may be used in place of the UIM card. Regarding this, various electronic devices that can be carried around portably, such as an IC card or an IC tag, may be used in place of the UIM.

Regarding communication between the mobile electronic device and the terminal (reader/writer), the mobile electronic device may have a configuration that only makes a response with respect to a command transmitted from a terminal. Another configuration example is one in which the mobile electronic device performs an operation other than making a response with respect to a command transmitted form the terminal (reader/writer). In the following, what is referred to as a terminal will mean a terminal functioning as a reader/writer.

A program, or computer program, for implementing the functions of the mobile electronic device may be provided. The mobile electronic device is the UIM 11 in the present embodiment.

In this case, either contact-type communication or contactless communication may be used as the type of communication between the mobile electronic device and the terminal.

In contact-type communication, metal contact points are provided on each of the terminal and the mobile electronic device, and communication is done therebetween, in the condition in which the contact points of the terminal and the contact points of the mobile electronic device are brought into contact with each other. In this case, the conductive path joining the terminal and the mobile electronic device connected by these contact points serves as a communication path. The path is a wired path.

In contactless communication, an antenna such as a loop antenna is provided in each of the terminal and mobile electronic device, and the terminal and the mobile electronic device communicate by electromagnetic induction between the antennas thereof. In this case, the air path through which electromagnetic induction occurs serves as the communication path. The path is a wireless path.

In order for the terminal reads out and overwrites information stored internally in the mobile electronic device, it transmits to the mobile electronic device commands in accordance with a specific protocol, UART (Universal Asynchronous Receiver Transmitter). The mobile electronic device, for example, holds a command received from the terminal via the UART in a receiving buffer of the storage, after which it interprets the command held therein and executes processing responsive to the command.

The configuration may be one in which the mobile electronic device has a power supply, or alternatively the mobile electronic device does not have a power supply, but rather is supplied with electric power from the terminal or the like, by either contact or by contactless supply.

The above-noted embodiment shows a configuration in which two operating systems are switched and launched in the mobile terminal 12. Regarding this, another configuration example may be one in which three or more operating systems are switched and launched.

The above-noted embodiment shows a configuration in which a plurality of operating systems are not launched simultaneously. Regarding this, another example of the configuration may be one in which it is possible to launch a plurality of operating systems simultaneously. In this case, in the mobile electronic device, the OS identifier 121 of the controller 103 identifies the OS that has made access from the mobile terminal 12, and also identifies the OS of the mobile terminal 12 that executes processing for payment or the like. In the present embodiment, the mobile electronic device is the UIM 11.

In the above-noted embodiment, in the UIM 11 and the mobile terminal 12, payment processing was used as the processing using information held by the server 15 that can communicate via the network 14. In the present embodiment, this information is sensitive data. Regarding this, as another example of the configuration, processing that communicates, for example, medical information, processing that communicates information stored on a national identification card such as the My Number Cards, as they are known in Japan, or processing that communicates other information having a high level of secrecy may be used. One example of information stored on a My Number Card is information regarding traffic violations.

According to the above-noted embodiment, the UIM 11 connected to the mobile terminal 12 has an identifier that identifies the operating system (OS) of the mobile terminal 12, a determiner 122 that, if the identifier identifies the prescribed operating system, performs processing to determine whether or not authentication data held in its own device, or in the UIM 11, and authentication data held in an authentication data holding device that can communicate via the network 14 match, and a permitter 123 that, if the determiner 122 determines that there is a match, permits prescribed processing using processing data held in a processing data holding device that can communicate via the network 14. In the present embodiment, the identifier is the OS identifier 121, the authentication data holding device is the server 15, and the processing data holding device is the server 15.

In the UIM 11, this enables identification of the OS accessing the UIM 11 and, for example, determination of whether or not user identity verification is required in order to use a communication line with respect to each operating system. The OS identification is, for example, identification of the OS transaction. This also enables execution of transactions in the UIM 11 after having verified the user identity. In the UIM 11, for example, it is possible to limit transactions from the secure OS. Processing to limit transactions is implemented, for example, by applying conditions to transactions.

In this manner, in the UIM 11, it is possible to securely perform processing that uses information of a device capable of communicating via the network 14.

According to the above-noted embodiment, in the UIM 11 connected to the mobile terminal 12, the identifier identifies the operating system of the mobile terminal 12 that accessed its own device (that is, the UIM 11).

In the UIM 11, if a plurality of operating systems is provided in the mobile terminal 12, this enables identification, from among the plurality of the OSs, of the OS that has accessed the UIM 11 as the valid OS.

According to the above-noted embodiment, in the UIM 11 connected to the mobile terminal 12, the mobile terminal 12 has a first operating system and a second operating system that has a higher security level than the first operating system, and the prescribed operating system is the second operating system. The first operating system in the present embodiment is the non-secure OS, and the second operating system is the secure OS.

The result is that, in the UIM 11, if the OS with a high security level is identified, it is possible to limit transactions from that OS.

According to the above-noted embodiment, the authentication data holding device and the processing data holding device are the same device. In the present embodiment, this device is the server 15.

In the UIM 11, this enables processing that uses authentication data and information held in the device holding processing data to be performed securely.

According to at least one of the embodiments described above, by having an identifier that is connected to the mobile terminal and that identifies the operating system (OS) of the mobile terminal, the determiner 122 that, if the identifier identifies the prescribed operation system, determines whether or not authentication data held in its own device and the authentication data held in an authentication data holding device that can communicate via the network 14 match, and a permitter 123 that, if the determiner 122 determines that there is a match, permits prescribed processing using processing data held in a processing data holding device that can communicate via the network 14, secure processing can be performed using information of a device that can communicate via the network 14. In the present embodiment, the identifier is the OS identifier 121, the authentication data holding device is the server 15, and the processing data holding device is also the server 15.

A program for implementing the functions of the devices of the above-described embodiments can be stored into a computer-readable storage medium and the program stored in the storage medium can read into a computer system, which executes the program so as to perform processing. The devices, for example, may be one or more of the UIM 11, the mobile terminal 12, the terminal 13, the server 15, and the operating entity device 16. The storage medium may be a non-volatile storage medium.

The term "computer system" used here may include software and hardware. Software may include not only applications but one or more operating systems. Hardware may include any devices such as peripheral devices.

The term "computer-readable storage medium" refers to any available storage media, for example, but not limited to, an over-writable non-volatile medium such as a flexible disk, an optomagnetic disk, a ROM, or a flash memory, a removable medium such as a DVD (Digital Versatile Disc), or a storage device such as a hard disk or the like built into a computer system.

Additionally, the term "computer-readable storage medium" encompasses one holding a program for a given period of time, such as a volatile memory within a computer system serving as a server or client when a program is transmitted via a network such as the Internet or via a communication line such as a telephone line. The volatile memory is, for example, DRAM (dynamic random-access memory).

The above-noted program may be transferred from a computer system in which the program is stored in a storage medium or apparatus to another computer system, either via a transfer medium, or by a transfer wave in a transfer medium. In this case, the "transfer medium" transferring a program refers to a medium having a function that transfers information, such as a network such as the Internet, or a communication circuit such as a telephone line. The network may be, for example, a communication network, and the communication circuit may be, for example, a communication line.

The above-noted program may be for implementing a part of the above-described functionality. Additionally, it may be a so-called difference file enabling implementation by combination with a program that already has recorded therein the above-noted functionality in a computer system. The difference file may be, for example, a difference program.

In this manner, the various functional parts may be software functional parts or may be hardware functional parts such as LSI devices.

Throughout the specification and claims, the meaning of "data held in" includes "data is held in", "data was held in", and "data has been held in".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile electronic device comprising:
   an identifier that identifies an operating system being launched on a mobile terminal to which the mobile electronic device is connected, where the mobile terminal being configured to switch between launching a secured operating system and launching a non-secured operating system lower in security level than the secured operating system, and the identifier determining that the operating system identified is the secured operating system;
   a determiner that, in a case that the operating system identified is the secured operating system, performs processing to determine whether or not authentication data held in the mobile electronic device is matched to authentication data held in an authentication data holding device capable of performing communication via network; and
   a permitter that, in a case that the determiner determines that there is a match, permits data processing using processing data held in a processing data holding device capable of performing communication via network.

2. The mobile electronic device according to claim 1, wherein the identifier identifies the operating system of the mobile terminal that had or has an access to the mobile electronic device.

3. The mobile electronic device according to claim 1, wherein the authentication data holding device and the processing data holding device are implemented by a device.

4. The mobile electronic device according to claim 1,
   wherein the determiner receives the authentication data sent from the authentication data holding device and the determiner determines whether or not the authentication data received is matched to the authentication data held in the mobile electronic device.

5. The mobile electronic device according to claim 1,
wherein the determiner transmits the authentication data held in the mobile electronic device and receives information of a result of determining whether or not the authentication data transmitted is matched to the authentication data held in the authentication data holding device.

6. A processing method comprising:
identifying an operating system being launched on a mobile terminal to which a mobile electronic device is connected, where the mobile terminal being configured to switch between launching a secured operating system and launching a non-secured operating system lower in security level than the secured operating system;
determining that the identified operating system is the secured operating system;
performing, in a case that the operating system identified was determined to be the secured operating system, processing to determine whether or not authentication data held in the mobile electronic device is matched to authentication data held in an authentication data holding device capable of performing communication via network; and
permitting, in a case that the determination processing determines that there is a match, data processing using processing data held in a processing data holding device capable of performing communication via network.

7. The processing method according to claim 6,
wherein the determining comprises receiving the authentication data held in the authentication data holding device and determining whether or not the authentication data received is matched to the authentication data held in the mobile electronic device.

8. The processing method according to claim 6,
wherein the determining comprises transmitting the authentication data held in the mobile electronic device and receiving information of a result of determining whether or not the authentication data transmitted is matched to the authentication data held in the authentication data holding device.

9. A non-transitory computer-readable storing medium that stores a program which comprises:
identifying an operating system being launched on a mobile terminal to which a mobile electronic device is connected, where the mobile terminal being configured to switch between launching a secured operating system and launching a non-secured operating system lower in security level than the secured operating system;
determining that the identified operating system is the secured operating system;
performing, in a case that the operating system identified was determined to be the secured operating system, processing to determine whether or not authentication data held in the mobile electronic device is matched to authentication data held in an authentication data holding device capable of performing communication via network; and
permitting, in a case that the determination processing determines that there is a match, data processing using processing data held in a processing data holding device capable of performing communication via network.

10. The non-transitory computer-readable storing medium according to claim 9,
wherein the determining includes receiving the authentication data held in the authentication data holding device and determining whether or not the authentication data received is matched to the authentication data held in the mobile electronic device.

11. The non-transitory computer-readable storing medium according to claim 9,
wherein the determining includes transmitting the authentication data held in the mobile electronic device and receiving information of a result of determining whether or not the authentication data transmitted is matched to the authentication data held in the authentication data holding device.

* * * * *